United States Patent
Martin et al.

(10) Patent No.: US 9,367,832 B2
(45) Date of Patent: Jun. 14, 2016

(54) SYNCHRONIZING IMAGE DATA AMONG APPLICATIONS AND DEVICES

(75) Inventors: Joseph J. Martin, San Francisco, CA (US); Venkatachary Srinivasan, Sunnyvale, CA (US); Jerald J. Singh, Santa Cruz, CA (US); Marco Boerries, Los Altos Hills, CA (US); Torsten Schulz, Pinneberg (DE)

(73) Assignee: YAHOO! INC., Sunnyvale, CA (US)

(*) Notice: Subject to any disclaimer, the term of this patent is extended or adjusted under 35 U.S.C. 154(b) by 2281 days.

(21) Appl. No.: 11/325,830

(22) Filed: Jan. 4, 2006

(65) Prior Publication Data

US 2007/0156434 A1    Jul. 5, 2007

(51) Int. Cl.
| G06F 15/16 | (2006.01) |
| G06Q 10/10 | (2012.01) |
| G06F 17/30 | (2006.01) |
| G06Q 10/06 | (2012.01) |
| G06Q 50/00 | (2012.01) |

(52) U.S. Cl.
CPC ............ *G06Q 10/10* (2013.01); *G06F 17/3028* (2013.01); *G06Q 10/06* (2013.01); *G06Q 50/01* (2013.01)

(58) Field of Classification Search
CPC .................... G06F 17/30247; G06F 17/30265; G06F 3/1415; G06F 3/1462; H04N 1/00137; H04N 1/00177; H04N 1/00244
USPC ....................................... 709/203–217; 707/1
See application file for complete search history.

(56) References Cited

U.S. PATENT DOCUMENTS

| 4,354,230 A | 10/1982 | Murphy et al. |
| 4,631,146 A | 12/1986 | Gebauer et al. |

(Continued)

FOREIGN PATENT DOCUMENTS

| EP | 0144815 A1 | 6/1985 |
| EP | 0772327 A2 | 5/1997 |

(Continued)

OTHER PUBLICATIONS

International Search Report and Written Opinion mailed Jan. 23, 2008, for PCT Application No. PCT/US06/48839 filed Dec. 22, 2006, 9 pages.

(Continued)

*Primary Examiner* — Melanie Jagannathan
*Assistant Examiner* — Najeebuddin Ansari
(74) *Attorney, Agent, or Firm* — James J. DeCarlo; Greenberg Traurig, LLP

(57) ABSTRACT

For providing synchronization of image data among diverse devices and applications, exemplary systems include a direct client application providing a user interface operable to allow a user to organize image data according to albums, and to select one or more albums for synchronization with one or more server interfaces that provide various image data manipulation, sharing, and features related thereto. Systems also include an intermediary system to assist in synchronization of select albums with handheld devices, and a notification server to provide scalable notifications of album updates made at server interfaces by users. Exemplary methods include steps providing for selection, from direct client applications, of albums to synchronize with devices, including handheld devices, and various steps of providing updates and notifications among appropriate system components.

12 Claims, 8 Drawing Sheets

(56) References Cited

U.S. PATENT DOCUMENTS

| | | | |
|---|---|---|---|
| 5,371,743 A | 12/1994 | DeYesso et al. |
| 5,371,882 A | 12/1994 | Ludlam |
| 5,436,960 A | 7/1995 | Campana, Jr. et al. |
| 5,440,719 A | 8/1995 | Hanes et al. |
| 5,475,813 A | 12/1995 | Cieslak et al. |
| 5,481,668 A | 1/1996 | Marcus |
| 5,663,948 A | 9/1997 | Kobunaya |
| 5,668,943 A | 9/1997 | Attanasio et al. |
| 5,684,990 A | 11/1997 | Boothby |
| 5,727,202 A | 3/1998 | Kucala |
| 5,774,668 A | 6/1998 | Choquier et al. |
| 5,787,437 A | 7/1998 | Potterveld et al. |
| 5,852,724 A | 12/1998 | Glenn, II et al. |
| 5,864,653 A | 1/1999 | Tavallaei et al. |
| 6,021,449 A | 2/2000 | Chow et al. |
| 6,092,169 A | 7/2000 | Murthy et al. |
| 6,105,067 A | 8/2000 | Batra |
| 6,134,581 A | 10/2000 | Ismael et al. |
| 6,144,999 A | 11/2000 | Khalidi et al. |
| 6,163,856 A | 12/2000 | Dion et al. |
| 6,170,065 B1 | 1/2001 | Kobata et al. |
| 6,236,991 B1 | 5/2001 | Frauenhofer et al. |
| 6,304,981 B1 | 10/2001 | Spears et al. |
| 6,311,187 B1 | 10/2001 | Jeyaraman |
| 6,452,809 B1 | 9/2002 | Jackson et al. |
| 6,457,062 B1 | 9/2002 | Pivowar et al. |
| 6,463,032 B1 | 10/2002 | Lau et al. |
| 6,463,463 B1 | 10/2002 | Godfrey et al. |
| 6,496,941 B1 | 12/2002 | Segal et al. |
| 6,505,236 B1 | 1/2003 | Pollack |
| 6,510,050 B1 | 1/2003 | Lee et al. |
| 6,543,004 B1 | 4/2003 | Cagle et al. |
| 6,571,354 B1 | 5/2003 | Parks et al. |
| 6,577,905 B1 | 6/2003 | Robertson et al. |
| 6,596,077 B2 | 7/2003 | Myerson |
| 6,611,849 B1 | 8/2003 | Raff et al. |
| 6,622,192 B2 | 9/2003 | Chou et al. |
| 6,633,907 B1 | 10/2003 | Spencer et al. |
| 6,633,910 B1 | 10/2003 | Rajan et al. |
| 6,647,260 B2 | 11/2003 | Dusse et al. |
| 6,654,500 B1 | 11/2003 | Lyu |
| 6,665,179 B2 | 12/2003 | Chou et al. |
| 6,670,982 B2 | 12/2003 | Clough et al. |
| 6,671,824 B1 | 12/2003 | Hyland et al. |
| 6,687,716 B1 | 2/2004 | Bradley |
| 6,691,243 B1 | 2/2004 | Belgardt et al. |
| 6,697,977 B2 | 2/2004 | Ozaki |
| 6,711,579 B2 | 3/2004 | Balakrishnan |
| 6,728,786 B2 | 4/2004 | Hawkins et al. |
| 6,744,874 B2 | 6/2004 | Wu |
| 6,766,469 B2 | 7/2004 | Larson et al. |
| 6,785,680 B1 | 8/2004 | Cragun |
| 6,785,868 B1 | 8/2004 | Raff |
| 6,799,224 B1 | 9/2004 | Dellacona |
| 6,822,951 B1 | 11/2004 | Patton |
| 6,834,195 B2 | 12/2004 | Brandenberg et al. |
| 6,839,564 B2 | 1/2005 | Sutinen et al. |
| 6,839,744 B1 | 1/2005 | Kloba et al. |
| 6,848,034 B2 | 1/2005 | Cohn et al. |
| 6,859,834 B1 | 2/2005 | Arora et al. |
| 6,865,157 B1 | 3/2005 | Scott et al. |
| 6,865,261 B1 | 3/2005 | Rao et al. |
| 6,865,597 B1 | 3/2005 | Bandopadhyay et al. |
| 6,883,034 B1 | 4/2005 | Pelavin et al. |
| 6,892,311 B2 | 5/2005 | Coppock et al. |
| 6,895,480 B2 | 5/2005 | Heil |
| 6,898,422 B2 | 5/2005 | Bern et al. |
| 6,901,429 B2 | 5/2005 | Dowling |
| 6,904,043 B1 | 6/2005 | Merchant et al. |
| 6,904,482 B2 | 6/2005 | Rietze et al. |
| 6,941,148 B2 | 9/2005 | Hansmann et al. |
| 6,978,453 B2 | 12/2005 | Rao et al. |
| 7,035,630 B2 | 4/2006 | Knowles et al. |
| 7,046,668 B2 | 5/2006 | Pettey et al. |
| 7,073,083 B2 | 7/2006 | Litwin, Jr. et al. |
| 7,080,350 B2 | 7/2006 | Saimi et al. |
| 7,152,100 B2 | 12/2006 | Thomas et al. |
| 7,231,432 B2 | 6/2007 | Aoki |
| 2001/0042124 A1 | 11/2001 | Barron |
| 2002/0016818 A1 | 2/2002 | Kirani et al. |
| 2002/0032020 A1 | 3/2002 | Brown et al. |
| 2002/0039420 A1 | 4/2002 | Shacham et al. |
| 2002/0087546 A1* | 7/2002 | Slater et al. ............... 707/10 |
| 2002/0116396 A1 | 8/2002 | Somers et al. |
| 2002/0124114 A1 | 9/2002 | Bottom et al. |
| 2002/0129109 A1 | 9/2002 | Nozaki et al. |
| 2002/0133821 A1 | 9/2002 | Shteyn |
| 2002/0174180 A1 | 11/2002 | Brown et al. |
| 2002/0194083 A1 | 12/2002 | Balabhadrapatruni et al. |
| 2003/0004884 A1 | 1/2003 | Kitazato |
| 2003/0065717 A1 | 4/2003 | Saito et al. |
| 2003/0074358 A1 | 4/2003 | Sarbaz et al. |
| 2003/0081557 A1 | 5/2003 | Mettala et al. |
| 2003/0084177 A1 | 5/2003 | Mulligan |
| 2003/0097361 A1 | 5/2003 | Huang et al. |
| 2003/0097381 A1 | 5/2003 | Detweiler et al. |
| 2003/0130882 A1 | 7/2003 | Shuttleworth et al. |
| 2003/0143983 A1 | 7/2003 | Crampton |
| 2003/0145021 A1 | 7/2003 | Parkkinen |
| 2003/0145074 A1 | 7/2003 | Penick |
| 2003/0177171 A1 | 9/2003 | Brown et al. |
| 2003/0195922 A1 | 10/2003 | Andrews et al. |
| 2003/0208546 A1 | 11/2003 | DeSalvo et al. |
| 2003/0212739 A1 | 11/2003 | Boucher et al. |
| 2003/0212826 A1 | 11/2003 | Rapakko et al. |
| 2003/0217125 A1 | 11/2003 | Brancati et al. |
| 2003/0236831 A1* | 12/2003 | Ortiz et al. ............... 709/204 |
| 2004/0006551 A1 | 1/2004 | Sahinoja et al. |
| 2004/0034692 A1 | 2/2004 | Eguchi et al. |
| 2004/0044799 A1 | 3/2004 | Sivaraman et al. |
| 2004/0059834 A1 | 3/2004 | Taylor et al. |
| 2004/0088390 A1 | 5/2004 | Hall et al. |
| 2004/0088414 A1 | 5/2004 | Flynn et al. |
| 2004/0103157 A1 | 5/2004 | Requena et al. |
| 2004/0151125 A1 | 8/2004 | Holmeide et al. |
| 2004/0181580 A1 | 9/2004 | Baranshamaje |
| 2004/0199614 A1 | 10/2004 | Shenfield et al. |
| 2004/0210450 A1 | 10/2004 | Atencio et al. |
| 2004/0215749 A1 | 10/2004 | Tsao |
| 2004/0225693 A1 | 11/2004 | Ganji et al. |
| 2004/0230661 A1 | 11/2004 | Rashid et al. |
| 2004/0246996 A1 | 12/2004 | Engel |
| 2004/0247090 A1 | 12/2004 | Nurmela |
| 2004/0252700 A1 | 12/2004 | Anandakumar et al. |
| 2005/0003807 A1 | 1/2005 | Rosenfelt et al. |
| 2005/0015430 A1 | 1/2005 | Rothman et al. |
| 2005/0021637 A1 | 1/2005 | Cox |
| 2005/0041652 A1 | 2/2005 | Roy |
| 2005/0044235 A1 | 2/2005 | Balahura et al. |
| 2005/0055698 A1 | 3/2005 | Sasaki et al. |
| 2005/0060355 A1 | 3/2005 | Kadyk et al. |
| 2005/0063398 A1 | 3/2005 | Choudhury et al. |
| 2005/0063543 A1 | 3/2005 | Kayalackakom et al. |
| 2005/0076086 A1 | 4/2005 | Budd et al. |
| 2005/0080891 A1 | 4/2005 | Cauthron |
| 2005/0097173 A1* | 5/2005 | Johns et al. ............... 709/206 |
| 2005/0100329 A1 | 5/2005 | Lao et al. |
| 2005/0108289 A1 | 5/2005 | East et al. |
| 2005/0138228 A1* | 6/2005 | Hornback et al. ............ 710/15 |
| 2005/0234864 A1* | 10/2005 | Shapiro ................... 707/1 |
| 2006/0080286 A1* | 4/2006 | Svendsen ................. 707/3 |
| 2006/0173998 A1 | 8/2006 | Ohara |
| 2006/0174206 A1* | 8/2006 | Jung et al. ............... 715/751 |
| 2007/0014300 A1 | 1/2007 | Breuer et al. |
| 2007/0014303 A1 | 1/2007 | Schulz et al. |
| 2007/0016636 A1 | 1/2007 | Boerries et al. |
| 2007/0143438 A1 | 6/2007 | Citrin et al. |
| 2007/0168544 A1 | 7/2007 | Sciammarella |
| 2007/0233791 A1 | 10/2007 | Sylthe et al. |
| 2007/0294306 A1* | 12/2007 | Toutonghi et al. ............ 707/200 |

(56) References Cited

U.S. PATENT DOCUMENTS

FOREIGN PATENT DOCUMENTS

| | | |
|---|---|---|
| EP | 0909058 A2 | 4/1999 |
| EP | 0986225 A1 | 3/2000 |
| EP | 1126387 A2 | 8/2001 |
| EP | 1221661 A2 | 7/2002 |
| EP | 1280314 A2 | 1/2003 |
| EP | 1296252 A1 | 3/2003 |
| EP | 1406458 A1 | 4/2004 |
| EP | 1418771 A2 | 5/2004 |
| EP | 1418772 A2 | 5/2004 |
| EP | 1443701 A1 | 8/2004 |
| JP | 5067059 A | 3/1993 |
| JP | 7262104 A | 10/1995 |
| JP | 10308758 A | 11/1998 |
| JP | 2000209254 A | 7/2000 |
| JP | 2001326695 A | 11/2001 |
| JP | 2002198925 A | 7/2002 |
| WO | WO-9728505 A1 | 8/1997 |
| WO | WO-9859477 A1 | 12/1998 |
| WO | WO-9934305 A1 | 7/1999 |
| WO | WO-9961984 A1 | 12/1999 |
| WO | WO-9962268 A2 | 12/1999 |
| WO | WO-9965256 A2 | 12/1999 |
| WO | WO-0067176 A2 | 11/2000 |
| WO | WO-0175684 A2 | 10/2001 |
| WO | WO-0197442 A2 | 12/2001 |
| WO | WO-0227547 A1 | 4/2002 |
| WO | WO-0233593 A1 | 4/2002 |
| WO | WO-02091224 A1 | 11/2002 |
| WO | WO-03005206 A2 | 1/2003 |
| WO | WO-03079144 A2 | 9/2003 |
| WO | WO-03083691 A1 | 10/2003 |
| WO | WO-03102778 A2 | 12/2003 |
| WO | WO-2004040470 A1 | 5/2004 |
| WO | WO-2004044773 A1 | 5/2004 |
| WO | WO-2004049104 A2 | 6/2004 |
| WO | WO-2005001665 A2 | 1/2005 |
| WO | WO-2005008998 A1 | 1/2005 |
| WO | WO-2005010715 A2 | 2/2005 |
| WO | WO-2005011215 A1 | 2/2005 |

OTHER PUBLICATIONS

"LANSurveyor® Version 7 User's Manual," (1993-2002). Neon Software, Inc.: Lafayette, CA, pp. 1-236.

Aprilog.com. (2000). "Plcc-adapter.com," located at <http://plcc-adapter.com/Site/ZIF-PLCC-to-PLCC-adapters.htm> visited on Aug. 25, 2006. 3 pages.

Cherniak, M. et al. (Sep. 11, 2001). "Data Management for Pervasive Computing," VLDB: Rome, Italy, pp. 1-69.

Ashdown, L. et al. "Oracle9i: Recovery Manager Reference," Release 2 (9.2), Mar. 2002, Oracle Corporation: Redwood City, CA, 292 pages.

"Managed Services Solutions for Federal Government Agencies," Motorola, Inc., May 7, 2003, 8 pages, located at <http://www.motorola.com/governmentandenterprise/contentdir/en_US/Files/SolutionInformation/FEDWhitePaperOverview.pdf>.

Barbir, A. et al. (Jul. 2003). "RFC 3568: Known Content Network (CN) Request-Routing Mechanisms," located at <http://www.faqs.org/rfcs/rfc3568.html> visited on May 10, 2007, 15 pages.

Expand Networks. (Apr. 2004). "The Role of Accelerators in Disaster Recovery: Enabling Cost-Effective, High-Performance Backup Networks," Roseland, New Jersey, 8 pages.

"EssentraTM Product Suite: General Description," Jul. 2004, VocalTec Communications Ltd.: Fort Lee, New Jersey, pp. 1-13.

Geekmail Inc. "Geekmail—IMAP, Anti-Spam Email Hosting," located at <http://web.archive.org/web/20040401200823/www.geekmail.com/home> visited on Dec. 7, 2005, 3 pages.

Kozierok, C. M. (Sep. 20, 2005). "The TCP/IP Guide," located at <http://www.tcpipguide.com/free/index.htm> visited on Dec. 6, 2005, 3 pages.

Mailgov. "Mailgov—Product Features," located at <http://web.archive.org/web/20040607035920/http://mailgov.com/product_features.php> visited on Nov. 9, 2005, 1 page.

Meeting Maker, Inc. (2005). "Meeting Maker Millennium Features & Benefits," located at <http://www.meetingmaker.com/products/meetingmaker/features_benefits.cfm> visited on Sep. 27, 2005, 2 pages.

Oracle. "Oracle9i Lite: Data Sheet," located at <http://www.oracle.com/technology/products/lite/htdocs/o9ilite_datasheet/htm> visited on Aug. 25, 2006. 5 pages.

Schuba, C. et al. (May 2005). "Integrated Network Service Processing Using Programmable Network Devices," Sun Microsystems, Inc.: Menlo Park, CA, Technical Report, pp. 1-27.

Yau, D. et al. (Date Unknown). "Extensible Network Security Services on Software Programmable Router OS," Purdue University: System Software and Architecture Lab, Department of Computer Science, 18 pages.

"IT Device Repair (ITDR)," (Date Unknown). Core Solutions: Anchorage, AK. 1 page.

\* cited by examiner

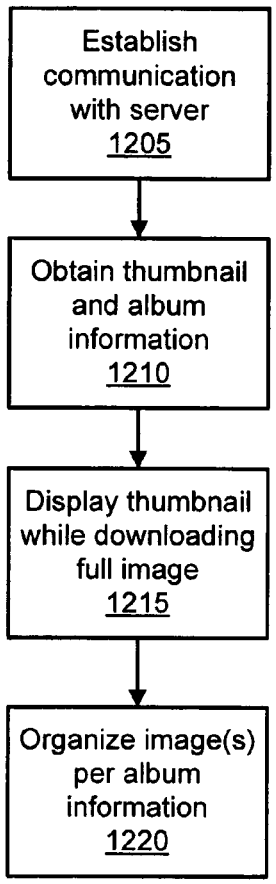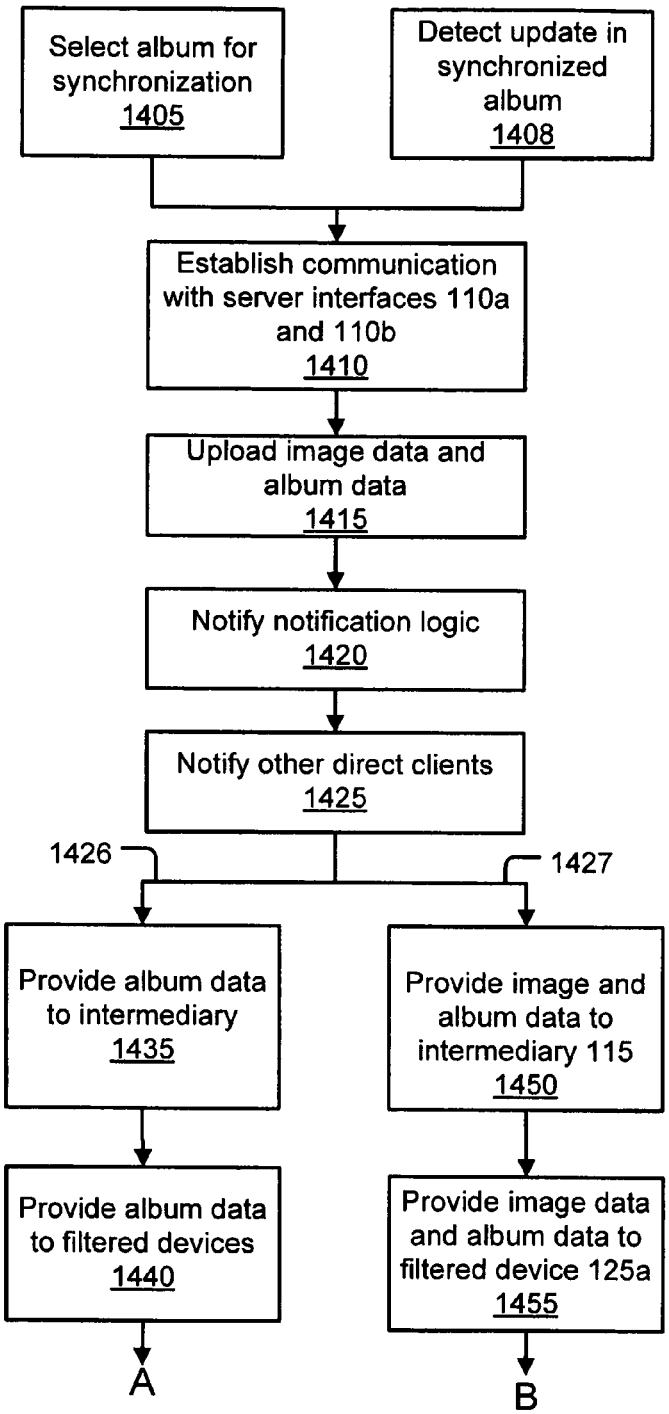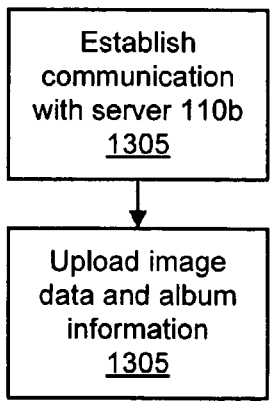

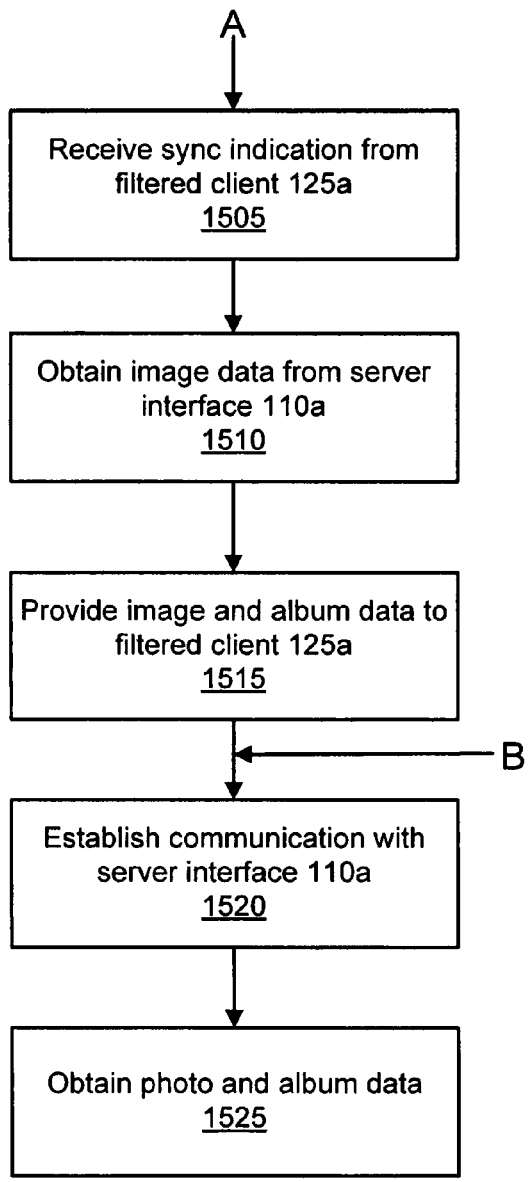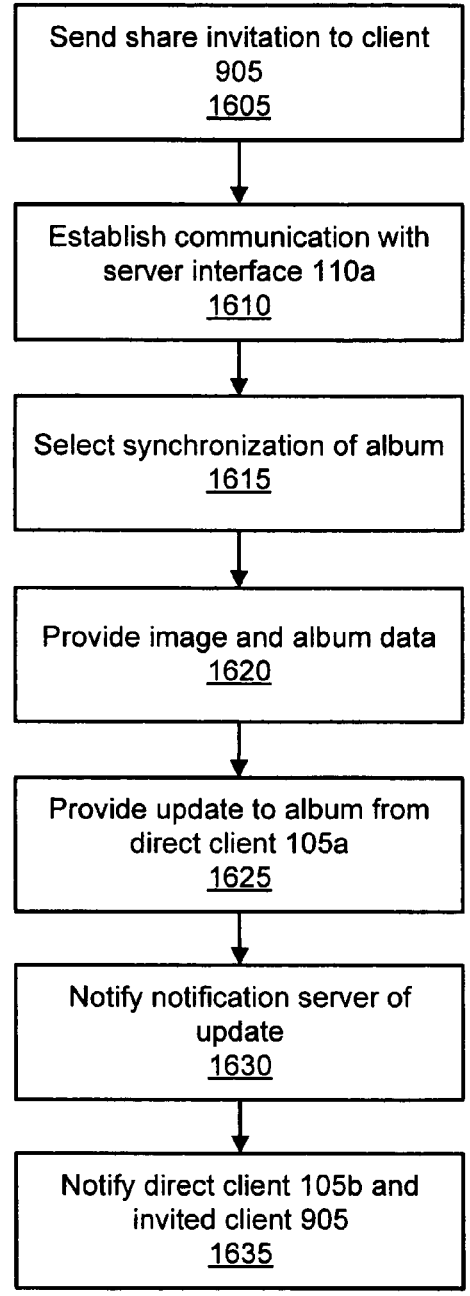
FIG. 15
FIG. 16

SYNCHRONIZING IMAGE DATA AMONG APPLICATIONS AND DEVICES

BACKGROUND

1. Field

The present invention relates generally to integrating data access across functionally and geography diverse devices and applications, and more particularly to simplifying experiences of users in sharing, copying, manipulating and otherwise using image data, such as photographs.

2. Description of Related Art

Digital imaging is ever increasing in popularity as a tool in business, as a hobby, and as a way for people to relate events happening in their lives to others. Across all such applications and usage models, people frequently have a variety of devices to capture and view digital imagery, such as still images (photographs) and video. Examples of these devices include cellular phones having built in cameras and/or capability to store and view images and/or clips of video and/or sound. Other devices examples include more full-functioned but smaller devices generally categorized as personal digital assistants. Still other examples of devices include laptop computers and desktop computers. Each of these devices may be connected to portable digital cameras, USB connected web cameras, and the like. A user may thus have a plurality of image capture and viewing devices, and may have various stores of imagery on each. The user may desire to have available at any of these devices imagery stored and/or captured on others of the devices. The user may also desire to share imagery on one or more of these devices with other people, including friends and even complete strangers. The user may also wish to take advantage of services and functionality relating to sharing, viewing, manipulating, printing, blogging, documenting, commenting, and any of a variety of other activities that may be available at a variety of websites or other establishments.

Current usage models for enabling user participation in such activities can be complicated and time consuming. What is needed is a more user-friendly way to allow such participation and to enable introduction and integration of future activities and functionality without excessive additional complications for the user.

SUMMARY

According to one aspect, a system for sharing image data comprises a first server interface operable to interface with a client application. The client application is associated with an account for a first user at the first server interface, and has access to a library of image data. The library may be organized by including association of image data with albums, and the first user may designate synchronization for one or more of the albums with at least one device of a first plurality of devices.

The system further comprises storage in operative communication with the first server interface for storing image data corresponding to the albums designated for synchronization, and logic operable to receive respective indications, from the at least one device, of availability to receive updates made to the albums designated for synchronization. The system also comprises logic for notifying devices that have provided indications of availability to receive updates in response to an updates made to any of the one or more albums designated for synchronization. The logic for notifying may be operable to implement a UDP based messaging protocol for notifying the client application.

According to another aspect, a computer program product comprises program code for a client application. The program code is operable to provide organization for a first plurality of image files, where the organization includes maintaining an association of each image file of the first plurality with at least one album of a plurality of albums. The program code is also operable to provide user selectability of an album for synchronization, and to transmit album data to a first server interface in response to selection for synchronization of an album. The program code is further operable to receive a notification that an update to the synchronized album has been made from another device; and retrieve the update to the synchronized album.

The computer program product may comprise program code further operable to provide a user interface including an image viewing window portion, and an information window portion. The information window portion may be populatable with metadata for an image selected for viewing from the first plurality of image files. The metadata may include tag information, and the information window portion further includes buttons for assignment of further tags, a description portion for receiving text to associate with the image, and a portion for contextual information that is refreshable from the first server interface.

In yet another aspect, an image data synchronization method comprises receiving registration information for a first client application from a user. The first client application is operable to interface with primary storage for a first plurality of image files, and to provide organization of the first plurality of image files by allowing association of each image file with at least one album of a first plurality of albums. The method also comprises receiving, at a first server interface, album data for albums designated for synchronization, and receiving at the first server an update to one or more of the designated albums. The method further comprises providing for notification of the update to the first client application, and providing for retrieval of the update by the first client application.

The method may also comprise receiving registration information for a filtered device, providing the filtered device a list of the designated albums, and receiving a selection of at least one designated album to be synchronized with the filtered device. The method may further include determining which updates correspond to albums synchronized with the filtered device and notifying the filtered device of updates to albums synchronized thereon.

In a further aspect, a system for synchronizing image data among devices comprises intermediary logic operable to receive registration information for devices, and a list of albums for synchronization among registered devices, where each album identifes image data. The system also comprises a first server interface operable to receive and store image data and updates corresponding to albums for synchronization, and notification logic in communication with at least one of the intermediary logic and the first server interface for receiving an indication that updates were received to albums for synchronization. The notification logic is operable to message registered devices that are synchronizing albums for which updates were received.

In a still further aspect, a system for synchronizing albums and devices comprises an update system operable to receive information from a plurality of users. The information includes albums of image files, and information on devices for association with each of the plurality of users. The update system is also operable to provide users access to at least the albums of image files. The system further comprises a client application for installation on a host system.

The client application is for association with a first user of the plurality of users, and is operable upon installation to interface with local mass storage, and provide a user interface for organization of image files into a library having a plurality of albums. The organization permits each image file to be associated with multiple albums, and a selection of albums of the plurality for synchronization. The client application is further operable upon installation, responsively to the selection of albums for synchronization, to send to the update system album data and image files corresponding to the selection of albums. The update system is further operable to notify other devices associated with the first user of availability of the selection of albums for synchronization.

BRIEF DESCRIPTION OF THE DRAWINGS

For a fuller understanding of aspects and examples disclosed herein, reference is made to the accompanying drawings in the following description.

FIG. 12 illustrates exemplary method steps corresponding to the block diagram of FIG. 4;

FIG. 13 illustrates exemplary method steps corresponding to the block diagram of FIG. 5;

FIG. 14 illustrates exemplary method steps corresponding to the block diagram of FIG. 6;

FIG. 15 illustrates exemplary method steps corresponding to the block diagrams of FIGS. 7 and 8; and FIG. 16 illustrates exemplary method steps corresponding to the block diagram of FIG. 9.

DETAILED DESCRIPTION

This description is exemplary and it will be apparent to those of ordinary skill in the art that numerous modifications and variations are possible. For example, various exemplary methods and systems described herein may be used alone or in combination with various imagery manipulation applications, networking hardware and software, instant messaging applications, peer to peer communication systems, and the like. Additionally, particular examples have been discussed and how these examples are thought to address certain disadvantages in related art. This discussion is not meant, however, to restrict the various examples to methods and/or systems that actually address or solve the disadvantages.

The following description relates examples and aspects systems and elements of systems for achieving synchronization of image data across a variety of devices, including laptops, desktops, cellphones, PDAs and the like and across a variety of websites and/or applications. Various aspects of synchronization include selecting albums of images to be automatically replicated and kept current on such devices, even where updates to those albums may occur on different devices and/or different web sites or applications. Different devices may synchronize different sets and/or subsets of albums. Different users may each control different synchronizing devices, and permissions may be controlled such that some synchronized albums may be updated only at certain devices or by certain users. Synchronization generally refers to coordinating information available to a variety of devices, and as such may have user involvement for designating what information should be available at what devices; users may also be involved in determining when and how the information is coordinated. For example, users may initiate synchronization or setup a schedule for synchronizing. The above aspects and other aspects are related in further detail below.

Figure 1:
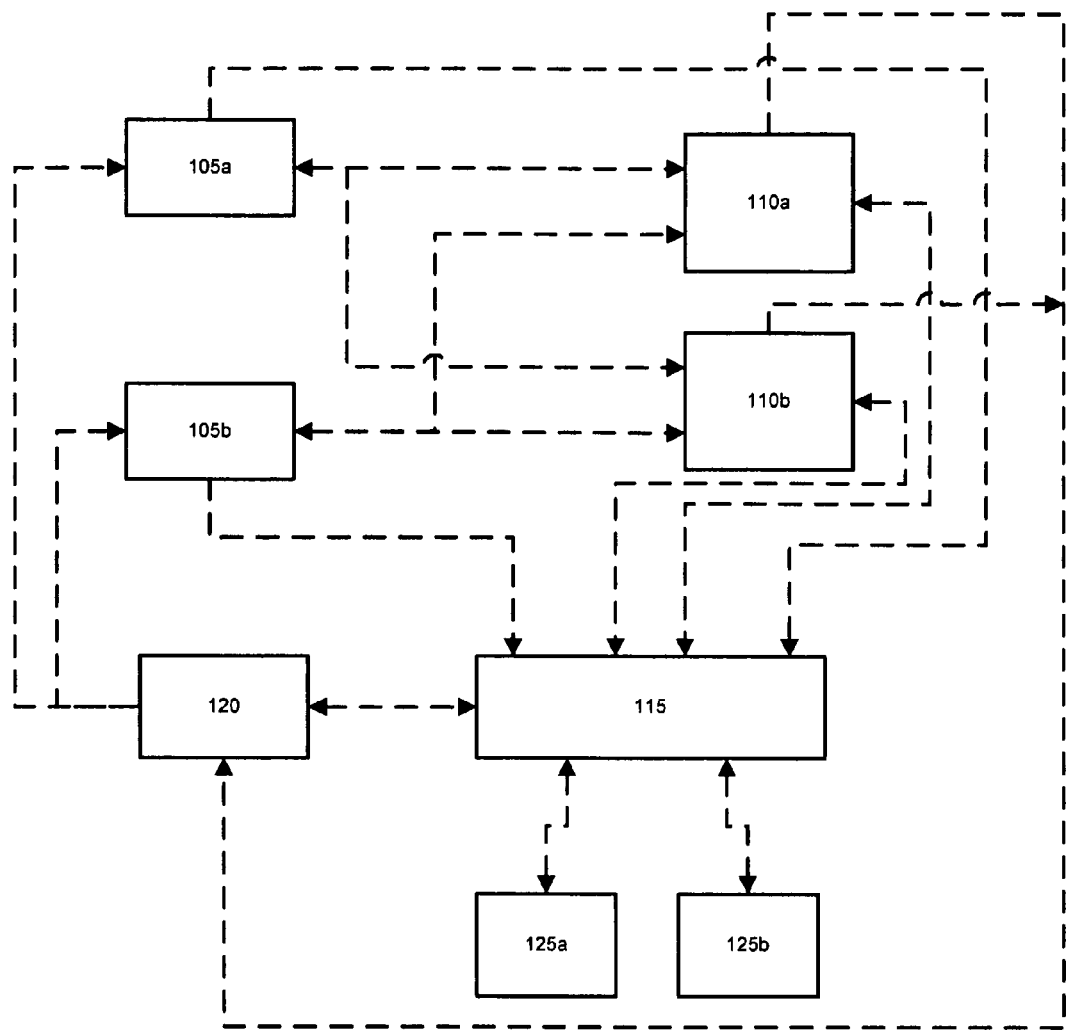
FIG. 1 illustrates an exemplary system implementing image data synchronization.

In the following description, FIG. 1 provides an overview of various components of an example synchronization implementation. In so doing, FIG. 1 illustrates various communications that may occur at different times and for different reasons among these components.

FIG. 1 illustrates direct client applications 105a and 105b. The direct client applications 105a and 105b may each include software packages or other code installed on respective host systems. Such software packages may rely on Microsoft Windows® operating system APIs or may be based on other operating systems such as Linux or Macintosh OS®. The code may include controls downloaded through web browsers, such as ActiveX type controls. The code may also include Java code interpreted by an interpreter, as well as markup languages and related syntax such as XML and SOAP, and any other code or logic that one of ordinary skill in the art may use to implement functions and features described herein. More detail concerning an exemplary direct client application is provided with reference to FIG. 2.

Direct client applications 105a and 105b may be hosted on a computer system, such as a desktop computer or a portable computer with a relatively large display device (e.g., a monitor or integrated display of a portable computer), and input devices such as a keyboard and a mouse or touchpad. Systems hosting direct client applications 105a and 105b may have access to considerable local storage for storing various applications, such as productivity software, image manipulation software, games, and the like, as well as for data associated with the various applications, for example texts, imagery (e.g., photographs and video), sounds, and the like. A user of direct client applications 105a or 105b may rely on this local storage as primary storage for all such applications, files and other data.

FIG. 1 further illustrates server interfaces 110a and 110b. Each of server interfaces 110a and 110b may be implemented with a variety of equipment, including a number of servers, each server potentially having a number of processors and various I/O interfaces. The equipment may also include storage, including storage internal to the servers, storage available through storage area networks, networked attached storage, and the like. Any variety of communication gear may be used for providing communication capability from networks to the equipment and among the various pieces of equipment. Such communication gear may include routers, switches, hubs, cabling, optical interfaces, leased communication lines, wireless LANS, PANS, and WANS, the public Internet, and associated communication software implementing communication and associated other protocols such as TCP/IP, UDP/IP, SONET, storage over Ethernet, HTTP, XML, SSL, and the like.

Server interfaces 110a and 110b may be hosted on shared physical equipment, may share communication gear, networks, load balancing equipment, and any other hardware or software as the particular implementation indicates appropriate. Various aspects of the server interfaces 110a and 110b may be implemented with a variety of software and other logic, such as web servers, SSL software, billing software, registration logic, databases for tracking registered users and associated biographical information, user navigation of the interface and logic for correlating behavior with demographic information or other information. Such software and logic may be distributed among various physically distinct hardware pieces, which may in turn be geographically dispersed. Any of a variety of other logic, software, and hardware may be employed for implementing other functions and features known by those of ordinary skill in the art.

The server interfaces 110a and 110b may communicate with one or more databases for storing data, such as image data including photographs, in one or more database formats. Each of the databases may also associatively store data related to photographs, including metadata such as albums with which the photograph was associated, photograph names, sizes, CRC information, date photograph was taken, date photograph was updated, tags that people have associated with the photograph, one or more ratings of the photograph, commentary on the circumstances and location where photograph was taken, and the like. For ease of reference, unless otherwise noted, image data refers also to metadata associated with specific image files, and album data refers to data describing albums into which image data may be organized.

Each of server interfaces 110a and 110b may share a database or may have an unshared individual database that may be adapted for particular requirements of that interface. Each of server interfaces 110a and 110b may then provide different functionality to a user accessing that server interface. For example, one interface may provide sharing and tagging functionality and organize photographs primarily based on tag information while another interface may organize photographs primarily based on associated albums and allow sharing functionality of photographs and control access to photographs based on sharing.

The Yahoo! property FlickR (http://www.flickr.com) is an example of a system having functionality primarily associated with user provided tagging of photographs that are otherwise organized into photostreams from particular users. FlickR may therefore be represented as a server interface accessing a database adapted specifically for FlickR functionality and/or a server interface accessing a database shared with another Yahoo! property. By further example, Yahoo! Photos is an example of a system that allows organization of photographs by album association. Yahoo! Photos may be presently represented as a server interface accessing a database also storing information for use by a FlickR server interface and/or databases storing only data for Yahoo! Photos functionality. Various permutations and variations of server/server interface functionality and implementations are possible. Any number of additional server interfaces for various usage models and systems with differing functionality are also possible for various inventive aspects. By example, FlickR may be adapted for supporting sound, video, and/or sound and video and associated tagging strategies.

FIG. 1 further illustrates intermediary 115 that mediates interaction between server interfaces 110a and 110b and filtered devices 125a and 125b. For one or more reasons, filtered devices 125a and 125b may be less capable devices than direct client applications 105a and 105b. For example, filtered devices 125a and 125b may have lower resolution or smaller displays, limited keyboards or no keyboard, limited battery life, and formfactors less comfortable for extended use. For example, filtered devices 125a and 125b may include cellular phones, personal digital assistants, wireless email clients, and other portable devices. Such portable devices may have wireless cameras and/or video recorders that may also capture sound separately or in addition to photographs and video. Future devices may have characteristics of both filtered devices and direct client applications, and such devices may thus have any mixture of functionality ascribed to filtered devices and direct client applications herein. Further, generally references to devices may refer to direct client applications as well.

The intermediary 115 formats (filters) information sent to filtered devices 125a and 125b based on capabilities of each device and/or user selected criteria and other settings for downloading of content. Thus, intermediary 115 helps in presenting content. The intermediary 115 may also provide location tracking information for such portable devices, and may also provide other functionality such as registration of other devices, such as direct client applications 105a and 105b. Such functionality will be further addressed with regard to FIGS. 2-15. Further description of exemplary intermediary systems and functionality may be found in U.S. patent application Ser. No. 11/182,288, filed Jul. 14, 2005, and entitled "Content Router Notification," and in U.S. patent application Ser. No. 11/182,614, filed on Jul. 14, 2005, and entitled "Methods and Systems for Data Transfer and Notification Mechanisms," both of which are incorporated by reference in their entirety herein.

FIG. 1 also illustrates notification logic 120 that communicates with the intermediary 115, server interfaces 110a and 110b, and direct client applications 105a and 105b. Various details regarding notification logic 120 are related with respect to FIGS. 2-15.

Various communication paths illustrated in FIG. 1 provide an overview of exemplary communication flows and represent messaging paths that may represent physical connections, or a series of virtual connections or router hops in a path that may vary packet by packet, by transaction, and/or by chance, as may be dictated by the communication means employed. As such, the illustrated lines do not necessarily represent any prearranged physical or virtual network connection or coupling.

In sum, an exemplary system in accordance with FIG. 1 may include one or more personal computers, each with one or more processors, one or more local mass storage devices (portable and/or fixed), memory, input and output devices, including display devices, keyboards, mice, and the like. The personal computers may connect to the Internet through a service provider, such as a provider of DSL or cable broadband Internet access.

Figure 2:
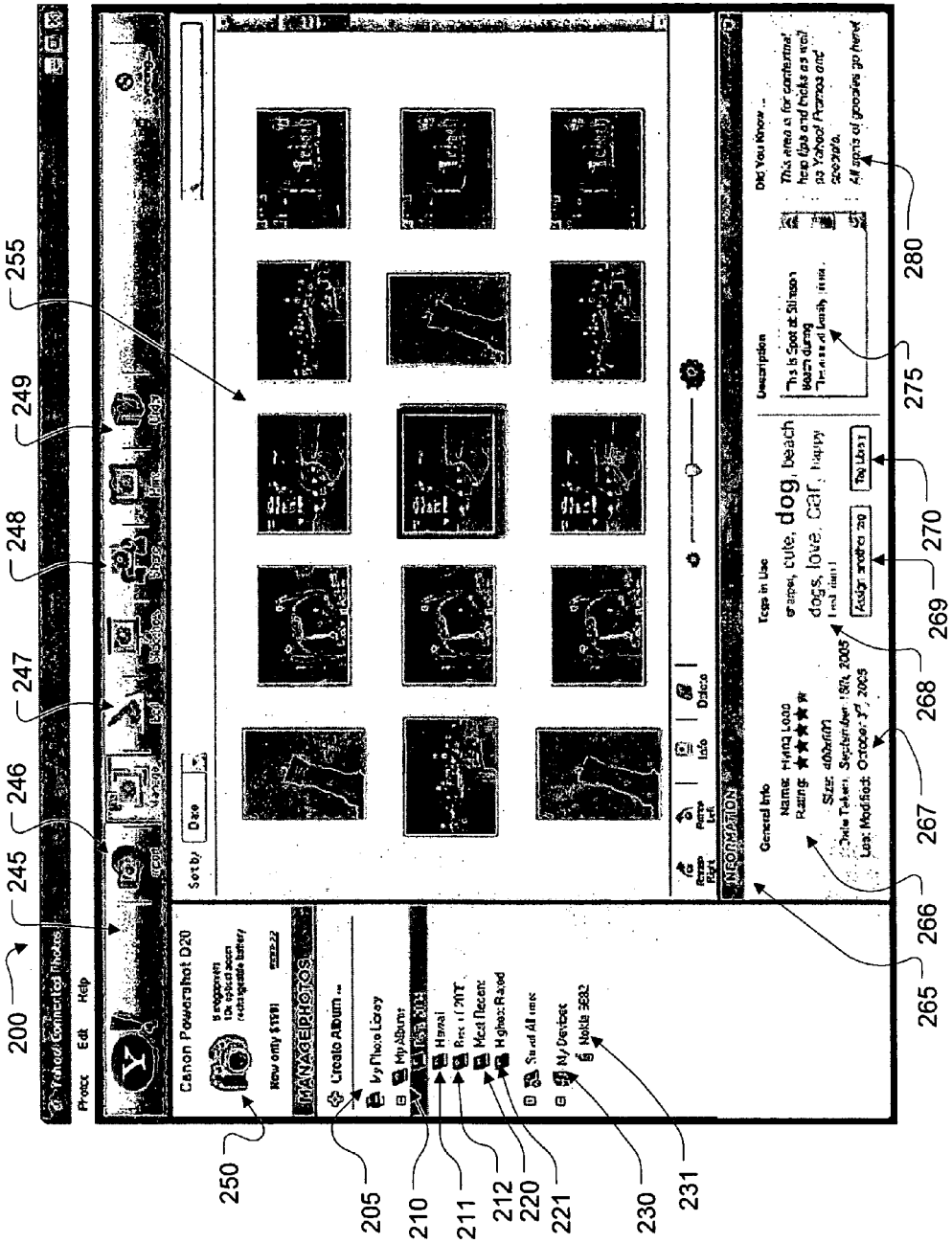
FIG. 2 illustrates an exemplary user interface for direct client applications.

The personal computers may have installed thereon a direct client application (as further described in FIG. 2). The direct client application may register with an intermediary that filters content for transmission to filtered devices, such as cellular telephones. The direct client applications may also communicate with a plurality of server interfaces and receive notifications of available updates and other information from notification logic. Each of the server interfaces may provide access to accounts created at one or more web sites or portions of web sites, for example a Yahoo! account for accessing Yahoo! Photos and/or a FlickR account. Further details regarding how components illustrated in FIG. 1 implement present inventive aspects are described with respect to FIGS. 2-15.

FIG. 2 illustrates a management view of an exemplary user interface 200 for a direct client application, such as direct client applications 105a and 105b. The user interface 200 includes an image library 205, and a hierarchical album list 210 having topical albums 211 and 212 as well as active albums 220 and 221. Topical and active albums are further described below.

The user interface 200 also includes a "my device" section 230 with known user devices provided below (e.g., user device 231). User devices may be populated in the my device 230 section through a variety of means, including by direct entry of identifying information in user interface 200, by plugging the device into and subsequent auto recognition of the device by the host (or exchange of information between device and host) of the direct client application, or by connecting through the network to intermediary 115, where each such device may be associated with a particular account that is in turn associated with the appropriate direct client application, as described below.

The exemplary user interface 200 further includes an advertising window 250 that may be located at the top left of the user interface 200. The advertising window 250 may be populated with advertisements that were previously downloaded and locally cached. Also, user interaction with the advertising window 250 may be provided and tracked. System characteristics may also be tracked and queried. For example, ink levels in cartridges of an attached printer may be determined through appropriate printer interfaces providing such information, and if ink level is low, advertisements for replenishment of printer ink may be selected for download and display.

The user interface 200 further includes a top menu 245 for selecting functionality available at that direct client application. Such functionality in the present example includes managing image data (the view as presently presented in FIG. 2), and importing image data 246 from a variety of sources such as by searching on local mass storage, attached solid state memory in cameras and card readers, CDs or DVDs located in appropriate readers, networked attached storage, and the like. Further functionality may include image editing 247, ordering 249 hard copy prints from images in the library 205, and sharing 248.

Below the top menu 245, the user interface in the managing view (as presented in FIG. 2) includes an image viewing window 255. Below the image viewing window is disposed an information window 265. In the present example, the information window 265 includes a general information portion 266 that includes a title for the image data selected in image viewing window 255, a rating of the image (may be selectable by clicking on the appropriate star), and other biographical information 267 that may include image resolution, date taken, and date modified.

To the right of the general information portion 266 in the present example, a tag portion 268 displays which tags are presently associated with the image data selected in image viewing window 255. The tag presentation portion may also include a tag assign button 269 and a tag library button 270.

The tag assign button 269 may bring up a window where users can enter free form tags or select from a library of existing tags that have been previously entered. The tag library button 270 may provide a list of the tags currently present in the system.

To the right of the tag portion 268, a description window 275 provides an opportunity to enter a description of the image data selected in image viewing window 255. To the right of the description window 275, a system information pane 280 is provided as a means for conveying contextual help information, promotional information, and other information that may be updated during connections with server interfaces 110a and 110b.

For illustrating certain inventive aspects, the present example provides that a single user or group of users having a preexisting relationship controls/owns both direct client application 105a and 105b. For example, direct client application 105a may be installed on a given user's (User A for ease of reference) desktop and direct client application 105b may be installed on User A's laptop. User A may have various login identifications for different web sites and other information or service providers, for example a Yahoo! user ID used for accessing Yahoo! Photos functionality and a separate FlickR ID for logging into FlickR. These different identifications may be entered into direct client applications through respective user interfaces 200. This linking of user IDs for accounts may occur during installation of the direct client application, or at any time subsequently. Direct client applications 105a and 105b may detect usage of supported websites and query the user whether the websites should be registered with the detecting direct client application. Server interfaces 110a and 110b may share login information for users.

Figure 3:
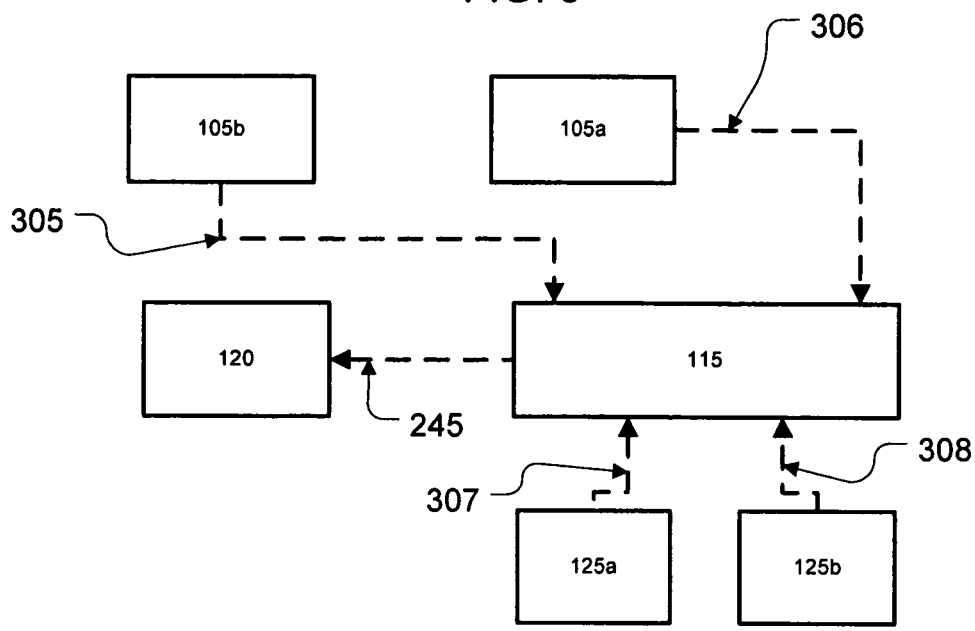
FIG. 3 illustrates exemplary system components and communication paths relating to registration of synchronizing devices.

FIG. 3 illustrates that direct client applications 105a and 105b and filtered devices 125a and 125b register with intermediary 115 through respective registration messages 305, 306, 307, 308. The registration messages may contain a variety of descriptive information concerning each device. The information may include screen resolution, storage capacity, download and upload speeds for direct client applications 105a and 105b and filtered devices 125a and 125b. Additional information for filtered devices 125a and 125b may include presence/type of keyboard or other I/O capabilities, battery life, and the like. As discussed above, the information may include various user identifications and login information that identify user accounts that may be accessed through server interfaces 110a and 110b or have information accessible by server interfaces 110a and 110b. The information may also include identification information for albums of image data that are to be synchronized with each registering device. For example, during registration, direct client application 105a may provide a listing of albums to which direct client application 105a is to be synchronized and hence to receive updates relating to those albums, when available. Registration may be a repeated step in that each time a device begins to interact with update system components, some portion of the information be provided, and may therefore be considered as registering.

Figure 10:
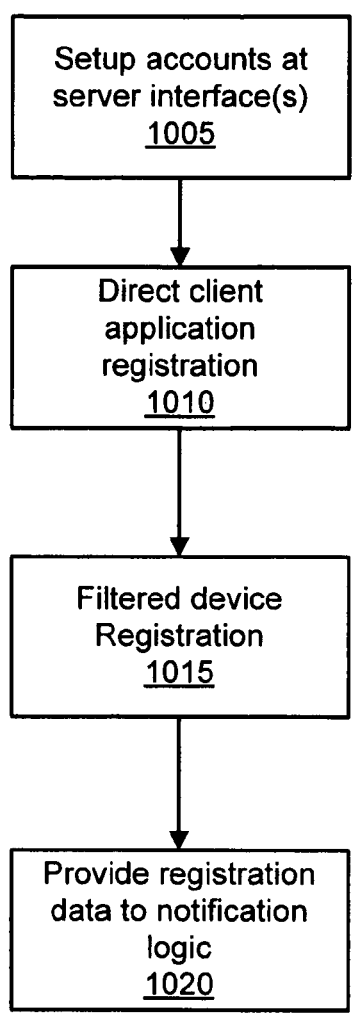
FIG. 10 illustrates exemplary method steps corresponding to the block diagram of FIG. 2.

FIG. 10 illustrates steps of an exemplary method explaining aspects of FIG. 3. At 1005, a user sets up accounts at server interfaces 110a and 110b. In an example, setting up an account may include registering with a web site providing functionality related to manipulation and sharing of photographs, such as registering with Yahoo! and thereby obtaining access to Yahoo! Photos. At this point the user may also be prompted as to whether he wishes to install a direct client application, and if so, then appropriate code may be transferred to and/or otherwise installed on the user's host system. Additional registration with web sites and additional functionality may occur by sharing a login ID or other identification information with other service providers or by obtaining a unique ID for other such providers. Thus, after step 1005, a user has one or more accounts that may be accessed through server interfaces 110*a* and 110*b*.

As described with reference to FIG. 2 above, direct client applications 105*a* and 105*b* may register with intermediary 115 at step 1010. Direct client applications 105*a* and 105*b* may register each time respective host systems for each of the direct client applications 105*a* and 105*b* have access to an Internet connection. For example, where a host system for direct client applications 105*a* accesses the Internet through a dynamic IP address network system, as may occur with some DSL implementations, the host system will likely have a different IP address each connection. Thus, the direct client applications 105*a* may send a message to intermediary 115 that it is online at the presently assigned IP address and ready for update notification.

The intermediary 115 may provide all or a portion of the information from registration messages 305, 306, 307, and 308 to notification logic 120. For example, intermediary 115 may provide IP address information for hosts of direct client applications 105*a* and 105*b*. The intermediary 115 may provide information to notification logic 120 to allow notification logic 120 to determine what notification messages to send and to where. Alternately, intermediary 115 may direct notification logic 120 to provide certain notification messages. For example, if User A activates direct client application 105*a*, which sends a registration message to intermediary 115 and direct client application 105*b* is not currently active, then intermediary 115 may either direct notification logic 120 to produce appropriate update messages, and notification logic 120 may then notify only direct client application 105*a*. Alternatively, intermediary 115 may direct notification logic 120 as to each separate update message to send, and would thus direct notification logic 120 to notify only direct client application 105*a*. Information such as album synchronization and device information may be transmitted with availability information or separately via communication with server interfaces 110*a* and/or 110*b*.

Figure 4:
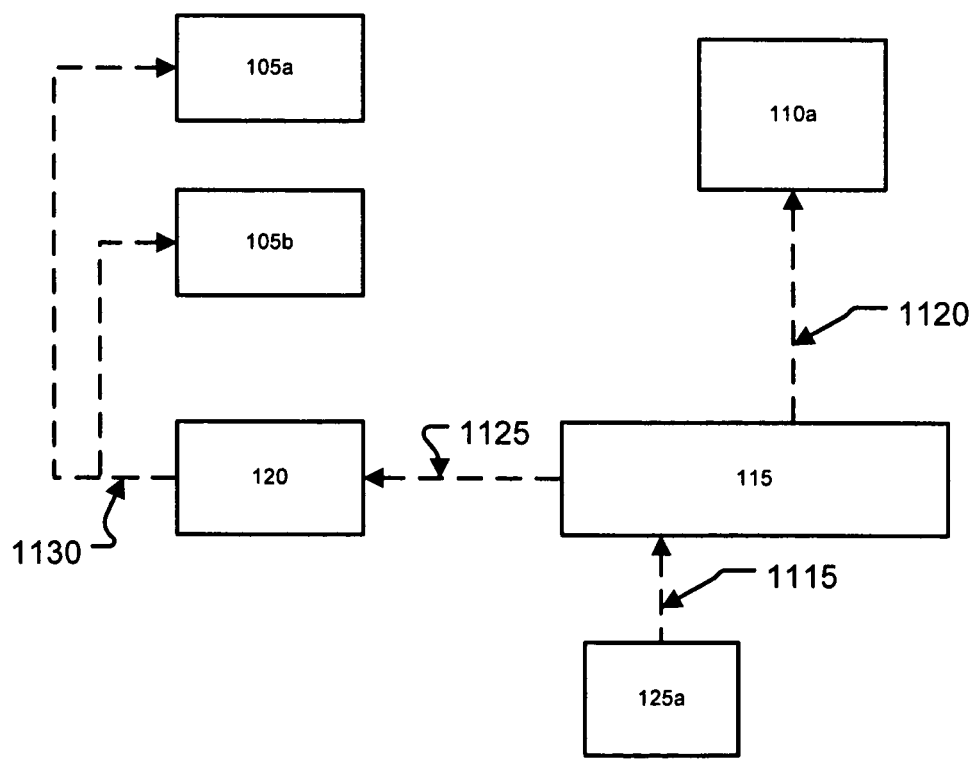
FIG. 4 illustrates exemplary system components and communication paths relating to notifying synchronizing devices of an update from a filtered device.
Figure 11:
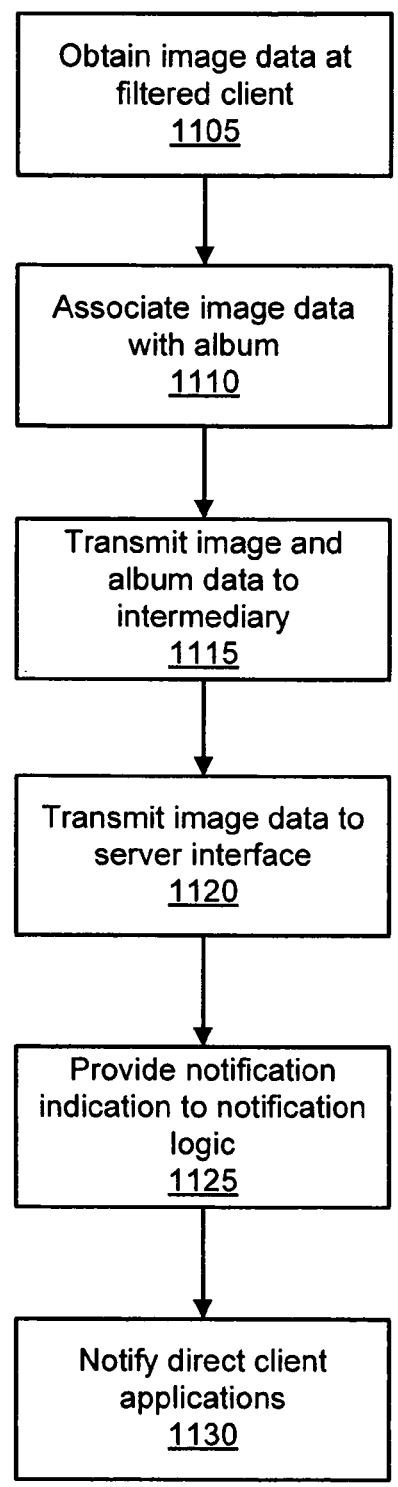
FIG. 11 illustrates exemplary method steps corresponding to the block diagram of FIG. 3.

A first example where notification of direct client applications 105*a* and 105*b* may be employed is described with reference to FIG. 4. This example provides an exemplary usage scenario where User A (described above as controlling direct client applications 105*a* and 105*b* and filtered device 125*a*) captures image data with filtered device 125*a*. FIG. 4 also illustrates an exemplary notification of an update available from filtered device 125*a*. FIG. 11 illustrates an exemplary corresponding method, which will also be discussed below.

At 1105 (FIG. 11), User A captures image data, such as a photograph, at filtered device 125*a*. At 1110, User A may associate the image data with an album loaded on the filtered device 125*a*, may create a new album, or filtered device 125*a* may associate a default album with the captured image data. Such settings may be configurable to allow entry or selection of an album and in the absence of such entry or selection, the default album may be associated.

At 1115, filtered device 125*a* transmits the captured image data and associated album data to intermediary 115. Where the album associated with the captured image data is other than a new album, associated album data may be an identification of the album, such as a unique ID number for referencing that album. Where the album is a default album then no album data need be transferred, as intermediary 115 may simply default to the default album. If a new album was associated, then the album data may comprise an album name. At 1120, intermediary 115 may then transmit the captured image data and associated album data to server interface 110*a*.

At 1125, intermediary 115 may also indicate to notification logic 120 that notifications should be dispatched to devices synchronizing the album with which the captured image data was associated (i.e., the created, default, or selected album above). The example of FIG. 4 assumes that both direct client applications 105*a* and 105*b* are synchronizing the album, and would receive update notification. In some examples, any direct client application of a user may synchronize with any album synchronized with a filtered device of the user. For example, since User A controls direct client applications 105*a* and 105*b* and filtered device 125*a*, both direct client applications 105*a* and 105*b* would synchronize every album on filtered device 125*a*. However, the converse may not be true. Selectivity in notification may include only notifying devices that have indicated availability to receive updates, by, for example, indicating that they are online through registration with intermediary 115.

At 1130, notification logic 120 notifies direct client applications 105*a* and 105*b*. Notification logic 120 may implement a low-overhead protocol for effecting this notification. For example, notification logic 120 may use a UDP datagram to ping each of direct client applications 105*a* and 105*b* than an update is available. The datagram need not contain further information concerning particulars of the update, as will be described with regard to FIG. 5. An advantage to avoiding provision of a great deal of information in the notification to direct client applications 105*a* and 105*b* is that forming and dispatching the smaller notification datagrams can be accomplished more quickly than forming a complicated datagram, which may make notification logic 120 more scalable.

The present system/method of notification may be further contrasted with a TCP update notification mechanism which requires establishing a communication session and sending/receiving acknowledgments for packets send during the session. Using a TCP based update notification mechanism to support many users would require more resources, including bandwidth, and hardware than a lighter weight update mechanism such as a UDP based mechanism. Because there is no provision in UDP to determine whether a UDP datagram arrived or not, and no automatic resend mechanism, the notification logic 120 may resend a notification to any of direct client applications 105*a* and 105*b* in response to a determination that the update has not been retrieved from server interface 110*a*.

Thus, from the system diagram of FIG. 4 and the method of FIG. 11, image data was captured at filtered device 125*a*, associated with at least one album, and transmitted through intermediary 115 to server interface 110*a*. In addition, intermediary 115 provided an indication to notification logic 120 that direct client applications 105*a* and 105*b* are to be notified that an update to the album is available.

Figure 5:
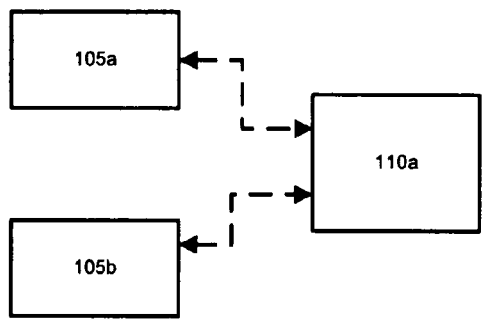
FIG. 5 illustrates exemplary further system components and communication paths relating to updating synchronizing devices.

FIG. 5 illustrates exemplary communications between direct client applications 105*a* and 105*b* in response to update availability notification. FIG. 12 illustrates exemplary method steps corresponding to FIG. 5.

In response to receiving update availability notification, at 1205 (FIG. 12) direct client applications 105*a* and 105*b* establish communication with server interface 110*a*. At 1210 (FIG. 12), each of direct client applications 105*a* and 105*b* first receive thumbnails of any image data corresponding to the update as well as information about the album(s) to which the image data corresponds. At 1215, direct client applications 105a and 105b may display the thumbnails while downloading full-sized images corresponding to the updates.

At 1220, direct client applications 105a and 105b may provide an opportunity for organization of the images received into albums. For example, User A may wish to associate the received images with other albums. This may be useful where User A sets filtered device 125a to associate captured images with a default album. The captured images may then be synchronized with direct client applications 105a and 105b (assuming that both 105a and 105b are selected for synchronization), stored in a library of image data (e.g., image library 205 of FIG. 2) and associated with the default folder for filtered device 125a at direct client applications 105a and 105b. If User A wishes to further organize, for example topically organize, the images, then User A may do so by further associating each image with at least one additional album.

As discussed with respect to notification logic 120 above, by employing lightweight notification logic, e.g., UDP based updating, better scalability may be achieved. However, since these UDP messages may not contain information describing the nature of the update available, during the connection described in FIG. 5, information will be exchanged determining what image and album data should be downloaded to the appropriate direct client application (as further described with respect to FIG. 7 and FIG. 14).

Where those additional albums are also synchronized with one or more devices (as will be discussed with regard to FIGS. 7-9 and 13-16), then User A may easily be able to provide appropriate updates to albums shared with different people and/or used on different web sites or applications. For example, if User A took pictures of national monuments while on vacation in Washington D.C., then User A may associate those pictures with albums dedicated to various interests, such as architecture, history, family vacations, and the like. Moreover, each image may be rated (as described with respect to FIG. 2) and direct client applications may then update active album 221 (most highly rated) with images qualifying by being rated highly. Various devices may be synchronized with active album 221, and would receive updates accordingly. In sum, each album may be shared with different audiences with differing interests (as explained with respect to FIG. 9), and each album may in turn be designated for synchronization with a differing set of devices among members of the different audiences so as to achieve a more intuitive, easier, and more scalable user interface and system for sharing image data.

Figure 6:
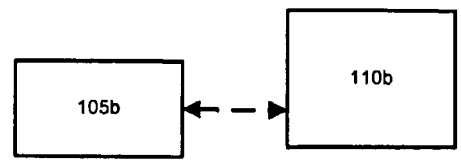
FIG. 6 illustrates updating additional components from a synchronizing device.

FIG. 6 illustrates an additional exemplary aspect of synchronization according to present examples; FIG. 13 illustrates method steps corresponding to FIG. 6. In FIGS. 4-5, there was illustrated a synchronization for image data captured at filtered device 125a with server interface 110a and direct client applications 105a and 105b. The present examples contemplate synchronizing image data with a variety of server interfaces selected for synchronization (e.g., additionally server interface 110b). FIG. 6 illustrates an example where server interface 110b is selected for synchronizing an album updated in the example of FIGS. 4-5 (and corresponding methods of FIGS. 11-12). At 1305 (FIG. 13), one of direct client applications 105a and 105b (here direct client application 105b), after receiving an update, establishes communication with server interface 110b (step 1305 in FIG. 13). At step 1310, direct client application 105b uploads information corresponding to the update, including updated image data as well album data as appropriate.

In other examples, as described above, server interfaces 110a and 110b may share a common database or may have one or more means of communication available to exchange information between them. In such cases, a direct client, application may not need to separately upload album data for synchronization to server interface 110b and instead server interface 110b may obtain updates from server interface 110a or by referencing a common database.

Figure 7:
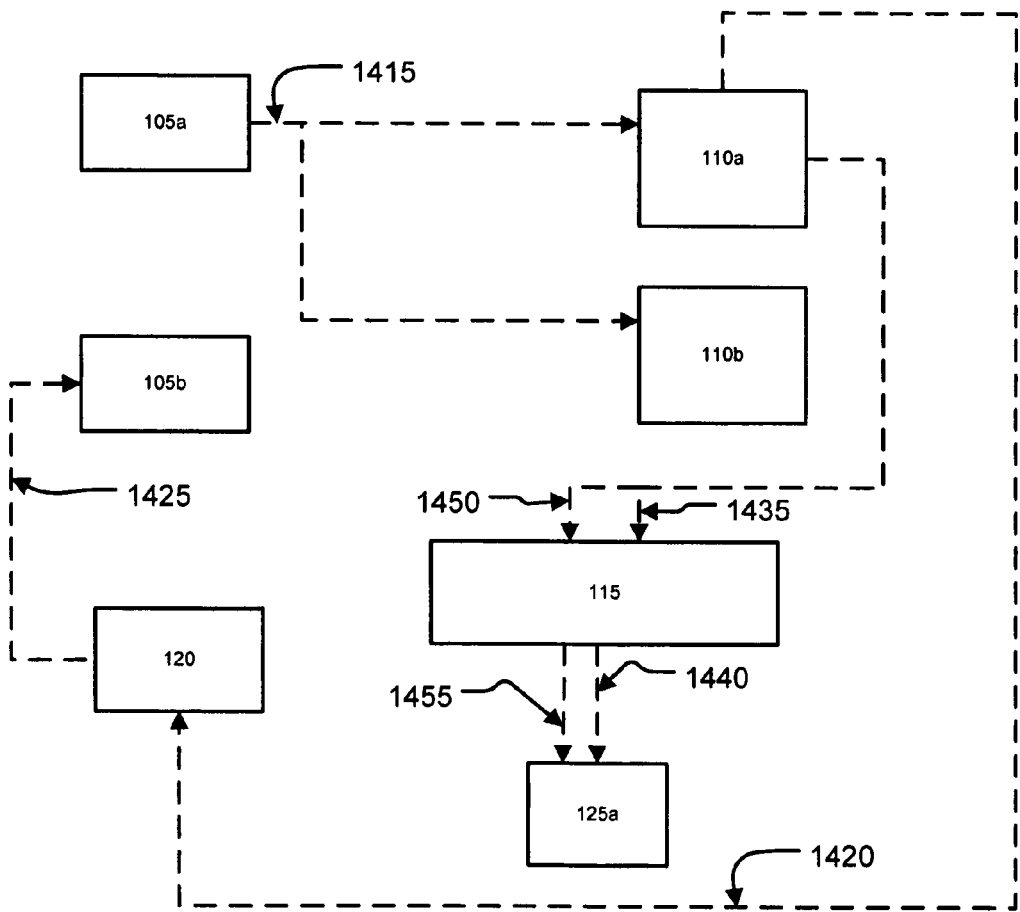
FIG. 7 illustrates exemplary system components and communication paths relating to initiating synchronization of an album from a synchronizing device.

FIG. 7 illustrates an exemplary synchronization of an album at direct client application 105a with other devices. There are two initial considerations to this synchronization. One is whether the synchronization is for an existing album or not. If for an existing album, a list of devices synchronizing with that album would be in existence already while if for an album selected for initial synchronization with other devices, a list of devices may be created.

As described above, one of more of intermediary 115 and server interfaces 110a and 110b may maintain an association of which devices are owned/controlled by a particular user. Previously, an example was that User A owns/controls direct client applications 105a and 105b and filtered device 125a. This association may occur by installing a direct client application on one or more devices and registering that application, or by registering filtered devices through desktop applications or by wirelessly connecting with filtered devices, where typically at least one application or device maintains information associating a user account at server interfaces 105a and 105b with one or more of the applications and devices.

In FIG. 7 and in a corresponding method of FIG. 14, User A selects an album for synchronization (1405 in FIG. 14) or updates an album already synchronized (1408 in FIG. 14). At 1410, communication is established between direct client application 105a and server interfaces 110a and 110b (may be sequential or in parallel). At 1415, image information corresponding to the album selected for synchronization or the update (as per 1405 and 1408 above) is uploaded to server interfaces 110a and 110b.

At 1420, server interface 110a (alternatively server interface 110b, if data is present there) notifies notification logic 120 that information is available for download by direct client application 105b. Notification logic 120 thereafter notifies direct client applications 105b. In the present example, there need not be a differentiation between whether a newly synchronized album was uploaded to server interface 110a from direct client application 105a, or whether only an update to a previously synchronized album was uploaded because in either case (as discussed with respect to FIG. 5, direct client application will connect to server interface 110a and during the connection will determine what data needs to be downloaded to achieve synchronization.

Figure 8:
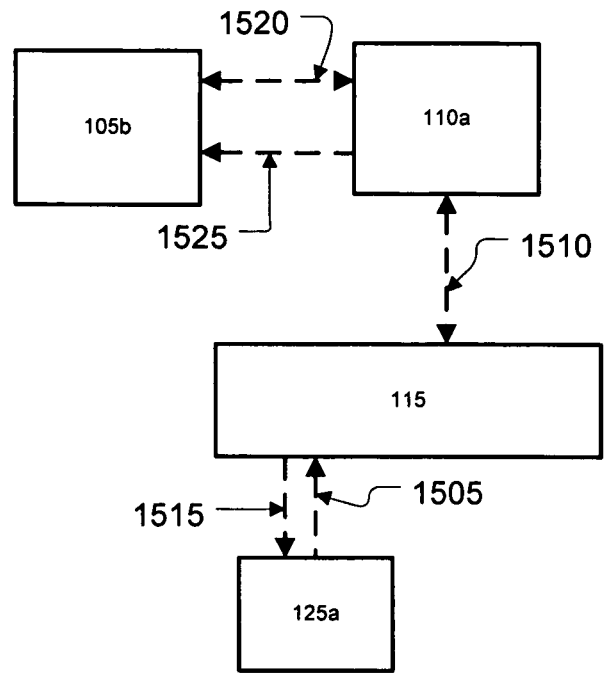
FIG. 8 illustrates exemplary system components and communication paths for completing synchronization of the album.

Step 1425 related to direct client notification, steps 1435-1455 relate to aspects of filtered device notification and synchronization. First following path 1426, the case where a previously unsynchronized album was selected for synchronization is covered. At 1435, server interface 110a provides album data for the newly synchronized album to intermediary 115, and at 1440 intermediary 115 provides that album data to filtered device 125a. A user at filtered device 125a may then review the album data and determine whether to synchronize that album at filtered device 125a. The method then enters FIG. 15 at A. Following path 1427, the case where an update to a previously synchronized album was uploaded is covered. At 1450, image and album data are provided to intermediary 115. At 1455, the image and album data (in potentially redacted or reduced resolution forms) is provided to filtered device 125a. Potential redactions or reductions in image resolution may be done to fit the album within a more confined memory space available on filtered device 125a. The method then enters FIG. 15 at B. FIG. 8 illustrates communications among apparatuses occurring during method steps of FIG. 15.

Returning to the newly synchronized album case, at 1505, intermediary 115 receives an indication that the album should be synchronized. At 1510, intermediary 115 obtains image data from server interface 110a and redacts or otherwise reduces resolution as required. At 1515, intermediary 115 provides the potentially redacted image data to filtered device 125a.

Steps 1520 and 1525 are common between the newly synchronized and updated album cases. In 1520, communication is established between direct client application 105b and server interface 110a. In 1525, direct client application 105b obtains photo and album data, which is determined based on comparing the information locally accessible to direct client application 105b with what is available at server interface 110a for items/albums synchronized at direct client application 105b.

Figure 9:
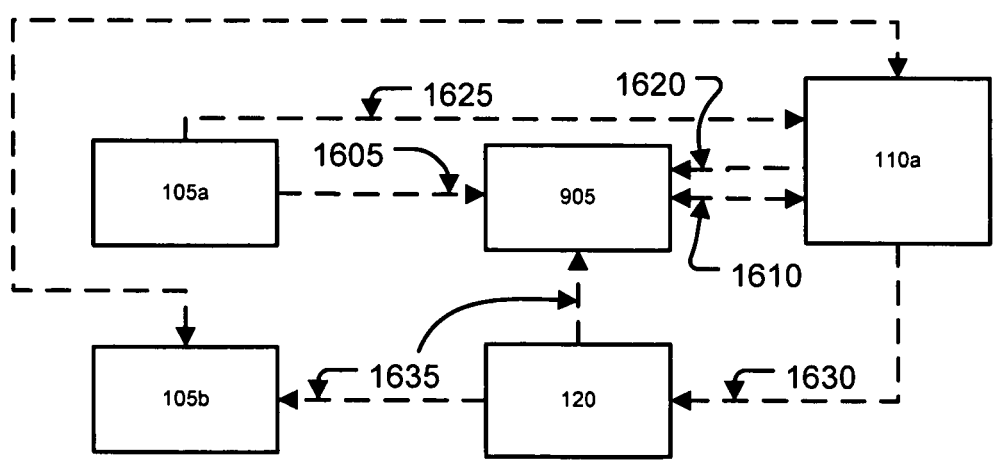
FIG. 9 illustrates exemplary system components and communication paths involved with sharing an album and synchronizing with a device not controlled by a user initiating sharing of the photograph album.

FIG. 9 illustrates apparatus involved in invitations to share with people and devices not controlled by the sharer, and subsequent synchronization of shared albums with devices controlled and not controlled by a single user or group of users. FIG. 16 illustrates corresponding method steps in such sharing and synchronization.

Direct client application 105a sends an invitation to invited client 905 (1605 in FIG. 16). Under control by a user (User B for convenience), invited client 905 establishes communication with server interface 110a (1610 in FIG. 16) and obtains for review the album content that User B was invited to share. At 1615, User B selects that the album proposed to be shared be synchronized to a direct client application installed at invited client 905. At 1620, server interface 110a then provides image data and album data corresponding to the album selected for synchronization.

Thus, at this point invited client 905 is synchronized with the album controlled by User A, which was first stored at direct client application 105a. Thereafter, if User A makes an update to the album shared, direct client application 105a provides, step 1625, the image and album data describing the update to server interface 110a. At 1630, server interface notifies notification logic 120 (either through intermediary 115 or directly, depending on implementation) that an update was made available. At 1635, notification logic notifies direct client application 105b and invited client 905 of the update. Each client may then retrieve the update as was described with respect to previous figures (e.g., FIG. 5). In such manner, a user may easily share a variety of albums with a number of people, and may update those albums in a convenient manner such that people sharing those albums also receive notification of updates without further involvement of the user.

The above example provided that User A controlled the album synchronized with an invited client. In other examples, other users may also be invited to post images or otherwise update albums that originated with some other user. For example, User A may invite User B to share an album and provide permissions that User B may also add images or otherwise update the album. User A may, for example, restrict User B ability to delete pictures. User A may continue to maintain ultimate authority over the album such that permissions of User B can be revoked. In such examples, direct client applications controlled by User A (e.g., direct client applications 105a and 105b) would receive notifications of updates made from other devices, e.g., invited device 905.

In all the above examples, a determination or some other setting may be made as to what granularity updates should trigger an update notification. For example, where server interface 110a supports tagging of pictures by any user sharing an album, users synchronizing that album on client applications may configure their applications (and responsively server interface 110a) to not notify on addition of tags. Or in large albums, updates may be combined into hourly or daily update notifications. In sum, users may select a granularity of notification that suits their needs and interests as enabled by various implementations of the exemplary methods and apparatuses described above.

User A may also configure direct client applications 105a and 105b to poll server interfaces 110a and 110b for updates, on a schedule or upon initiation by User A. For example, User A may configure direct client applications 105a and 105b to check for updates immediately after bootup, connecting to a network, reconnecting to a different network, starting the direct client application itself, at regular intervals, or the like. Such polling may be restricted as desired at server interfaces 110a and 110b, for example if loads exceed a desired metric.

The above examples generally related to synchronization of albums of image files, and some specific examples were particular to photographic image files. However, the above examples and description thereof are in no way limited to sharing only of albums of still images, but may also comprehend synchronization of albums of videos and other groups of related information.

This description is exemplary and it will be apparent to those of ordinary skill in the art that numerous modifications and variations are possible. For example, various exemplary methods and systems described herein may be used alone or in combination with video and image manipulation functionality resident in applications, with various web sites such as social networking, grouping websites, blogs and with various networking and communication technologies. Additionally, particular examples have been discussed and how these examples are thought to address certain disadvantages in related art. This discussion is not meant, however, to restrict the various examples to methods and/or systems that actually address or solve the disadvantages.

We claim:

1. A system comprising:
   a processor;
   a storage medium for tangibly storing thereon program logic for execution by the processor, the program logic comprising:
      album data receiving logic executed by the processor for receiving, from a first client device, album data for an album of images designated for synchronization with multiple devices, wherein the album data comprises image data;
      album review request logic executed by the processor for receiving, from a second client device of the multiple devices, a request to review the album of images, where the request comprises an invitation to share the album transmitted to the second client device by the first client device;
      album data review logic executed by the processor, for in response to the request, permitting the second client device to review the album data;
      album data update receiving logic executed by the processor for receiving, from the first client device, an update to the album, the update comprising image data and tag data;
      album data update notification logic executed by the processor for:
         determining a granularity of the update;
         determining whether the granularity of the update meets user-selected trigger criteria for notifying the second client device, wherein the granularity of the update indicates the update comprises tag data and the trigger criteria for notifying the second client device indicates a notification should be sent to the second client device in response to an update to a tag associated with an image of the album of images;

in response to determining the granularity of the update meets the user-selected trigger criteria, sending a notification to the second client device of the update to the album; and album data update retrieval logic executed by the processor for permitting the second client device to retrieve the update.

2. The system of claim 1, wherein the notification comprises a UDP datagram that does not contain image data.

3. A method, comprising:

receiving, using a computing device, from a first client device, album data for an album of images designated for synchronization with multiple devices, wherein the album data comprises image data;

receiving, using the computing device, from a second client device of the multiple devices, a request to review the album of images, where the request comprises an invitation to share the album transmitted to the second client device by the first client device;

in response to the request, permitting, using the computing device, the second client device to review the album data;

receiving, using the computing device, from the first client device, an update to the album, the update comprising image data and tag data;

determining, using the computing device, a granularity of the update;

determining, using the computing device, whether the granularity of the update meets user-selected trigger criteria for notifying the second client device, wherein the granularity of the update indicates the update comprises tag data and the trigger criteria for notifying the second client device indicates a notification should be sent to the second client device in response to an update to a tag associated with an image of the album of images;

in response to determining the granularity of the update meets the user-selected trigger criteria, sending a notification, using the computing device, to the second client device of the update to the album; and permitting, using the computing device, the second client device to retrieve the update.

4. The method of claim 3, wherein the notification comprises a UDP datagram.

5. The method of claim 4, wherein the UDP datagram does not contain image data.

6. The method of claim 4, further comprising:

determining, using the computing device, the update has not been retrieved for a threshold period of time; and in response to determining the update has not been retrieved for a threshold period of time, notifying, using the computing device, the second client device of the update to the album a second time.

7. The method of claim 3, wherein the notification comprises a thumbnail of the image data.

8. The method of claim 3, wherein the granularity of the update indicates the update comprises image data and the trigger criteria for notifying the second client device indicates a notification should be sent to the second client device in response to an update to an image of the album of images.

9. The method of claim 3, wherein the trigger criteria for notifying the second client device further comprise a notification time, wherein the second client device is notified of the update when a current time is equal to the notification time.

10. The method of claim 3, wherein the update is received at a first resolution from the first client device and the second client device is permitted to receive the update at a second resolution, wherein the second resolution is lower than the first resolution.

11. The method of claim 3, wherein the update is received without redactions from the first client device and the second client device is permitted to receive the update with redactions.

12. A non-transitory computer-readable storage medium encoded with executable instructions for a server, the instructions for:

receiving, from a first client device, album data for an album of images designated for synchronization with multiple devices, wherein the album data comprises image data;

receiving, from a second client device of the multiple devices, a request to review the album of images, where the request comprises an invitation to share the album transmitted to the second client device by the first client device;

in response to the request, permitting the second client device to review the album data;

receiving, from the first client device, an update to the album, the update comprising image data and tag data;

determining a granularity of the update;

determining whether the granularity of the update meets user-selected trigger criteria for notifying the second client device, wherein the granularity of the update indicates the update comprises tag data and the trigger criteria for notifying the second client device indicates a notification should be sent to the second client device in response to an update to a tag associated with an image of the album of images;

in response to determining the granularity of the update meets the user-selected trigger criteria, sending a notification to the second client device of the update to the album; and permitting the second client device to retrieve the update.

* * * * *